United States Patent
Yang

(10) Patent No.: US 10,174,851 B2
(45) Date of Patent: Jan. 8, 2019

(54) CHECK STRUCTURE OF A CONTROL VALVE BASE

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 37 days.

(21) Appl. No.: 15/446,748

(22) Filed: Mar. 1, 2017

(65) Prior Publication Data

US 2018/0252324 A1    Sep. 6, 2018

(51) Int. Cl.
*F16K 15/14*    (2006.01)
*F16K 27/02*    (2006.01)

(52) U.S. Cl.
CPC ........ *F16K 15/148* (2013.01); *F16K 27/0209* (2013.01)

(58) Field of Classification Search
CPC ................ F16K 15/148; F16K 27/0209
See application file for complete search history.

(56) References Cited

U.S. PATENT DOCUMENTS

| | | | | |
|---|---|---|---|---|
| 2,291,603 A | * | 8/1942 | Barker | A62B 18/10 137/512.15 |
| 3,610,273 A | * | 10/1971 | Russell | F04B 39/108 137/512.15 |
| 4,781,674 A | * | 11/1988 | Redmond | A61M 27/006 137/854 |

FOREIGN PATENT DOCUMENTS

FR    2291428 A1 *  6/1976  ........... F16K 15/148
TW       509300 U    11/2002

* cited by examiner

*Primary Examiner* — P. Macade Nichols
(74) *Attorney, Agent, or Firm* — Muncy, Geissler, Olds & Lowe, P.C.

(57) ABSTRACT

A check structure of a control valve base is provided, including a valve body, two seat bodies and two check members. Each seat body is assembled to the valve body, each check member is received in the seat body, each check member includes a blocking portion which is flexible, the blocking portion has a base portion and a side portion, and the side portion is obliquely connected to the base portion. When a water flow flows forward, the blocking portion and the seat body have a gap therebetween for the water flow to pass therethrough; and when the water flow flows reversely, the blocking portion contact the seat body tightly to block the water flow from flowing reversely.

6 Claims, 6 Drawing Sheets

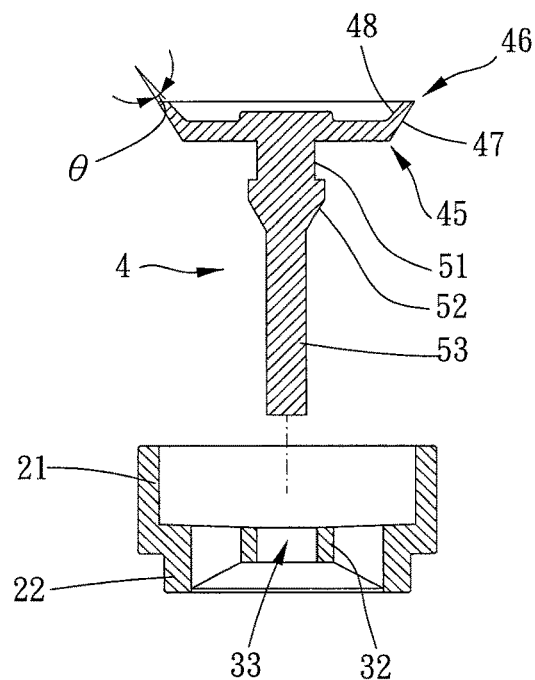
FIG. 5
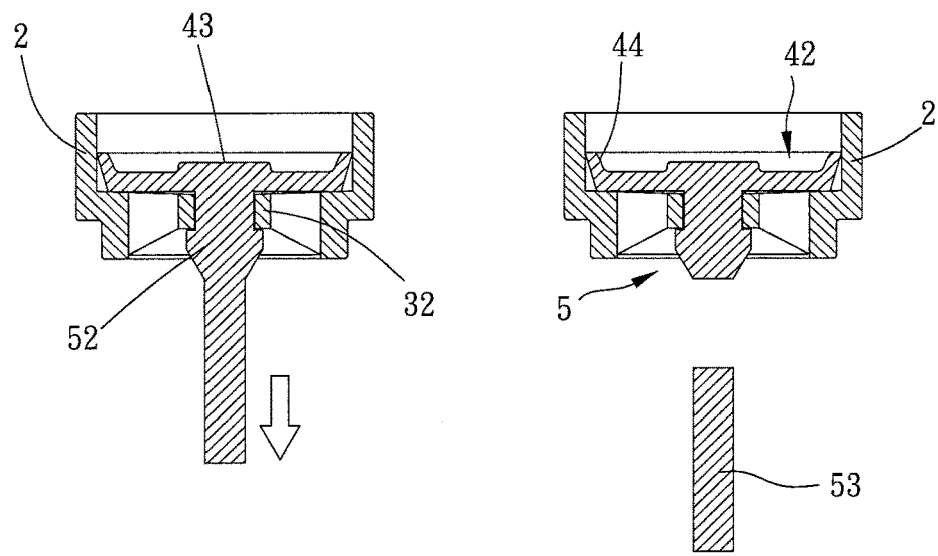
FIG. 6
FIG. 7

CHECK STRUCTURE OF A CONTROL VALVE BASE

BACKGROUND OF THE INVENTION

Field of the Invention

The present invention relates to a control valve base, and more particularly to a check structure of a control valve base.

Description of the Prior Art

A control valve is an essential component of a faucet structure and is often seen in a faucet for mixing hot and cold water. To prevent water which enters the control valve from flowing back and degrading the water quality, a check structure is often added in the control valve, such as a check structure of a control valve base disclosed in TW509300.

In the prior art, one of two ends of the check valve is an inlet which is round, the other end of the two ends of the check valve is an outlet which has two side bodies obliquely narrowed forward, when water enters from the inlet, the two side bodies are propped and expanded, and when the water is about to flow back, the two side bodies close to achieve the check effect. However, the water flowing back has a certain water pressure, and when the water pressure of the water flowing back is greater than a pressure that the two side bodies of the outlet can bear, the two side bodies deform and open the outlet and are unable to block the water.

The present invention has arisen to mitigate and/or obviate the afore-described disadvantages.

SUMMARY OF THE INVENTION

The major object of the present invention is to provide a check structure of a control valve base, which has a check member to provide preferable support to resist a water pressure of water flowing reversely and has a preferable fitness to keep water from leaking and prevent water from flowing reversely.

To achieve the above and other objects, a check structure of a control valve base is provided, including a valve body, at least one seat body and at least one check member. The valve body has a first face and a second face, the valve body has at least one inlet hole and an outlet hole, the first face has at least one annular flange which extends away from the second face, each said annular flange defines an interior space, and the interior space and the inlet hole communicate with each other. The at least one seat body is respectively received in the interior space of the at least one annular flange, each said seat body includes a first passage which has a large diameter, a second passage which has a small diameter and a first engaging portion, the first passage communicates with the second passage and is located between the inlet hole and the second passage, and the first and second passages have a step portion therebetween. The at least one check member is respectively positioningly disposed in the at least one seat body, each said check member includes a blocking portion which is flexible and a second engaging portion, the second engaging portion and the first engaging portion are positioningly engaged with each other, the blocking portion is received in the first passage and optionally blocks the first passage to be dis-communicated from the second passage, the blocking portion has a base portion and a side portion, the side portion is obliquely connected to the base portion, and as viewed in a direction facing the first face, the base portion covers the second passage. When a water flow flows from the first face toward the second face, the blocking portion is impacted by the water flow and further has a gap between the blocking portion and a wall of the first passage, and the first and second passages communicate with each other; when the water flow flows from the second face toward the first face, the blocking portion is impacted by the water flow and deforms, the base portion abuts against the step portion, and the side portion abuts against the wall of the first passage so as to block the first passage from communicating with the second passage.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIGS. 5 to 7 are drawings showing a check member being assembled to a seat body of the present invention;

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
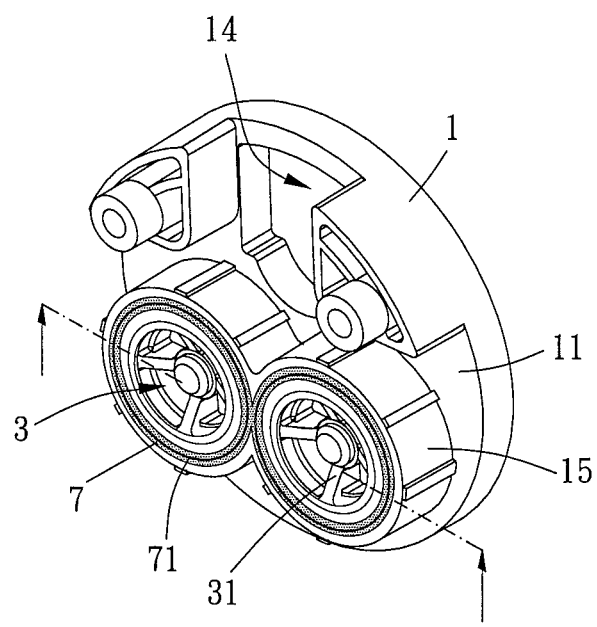
FIG. 1 is a stereogram of an embodiment of the present invention.
Figure 2:
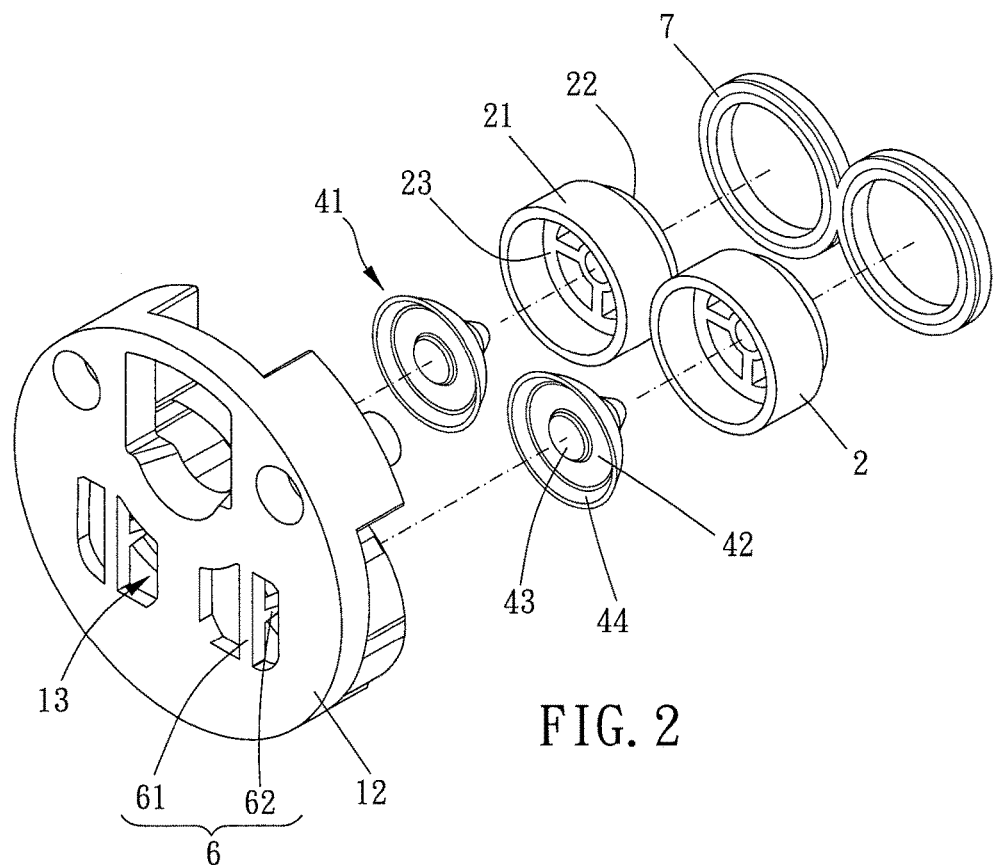
FIG. 2 is a breakdown view of FIG. 1.
Figure 3:
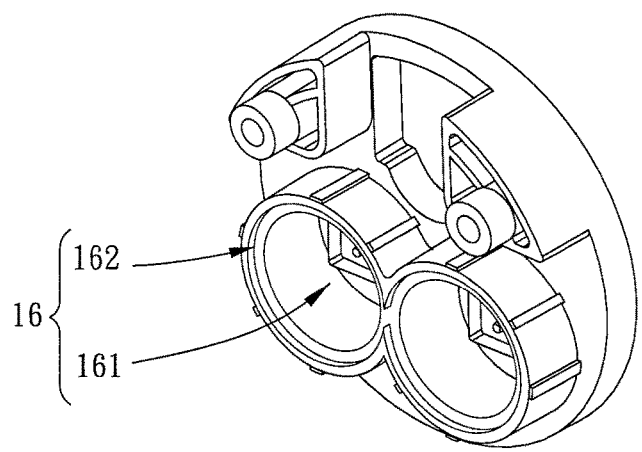
FIG. 3 is a stereogram of a valve body of the present invention.
Figure 4:
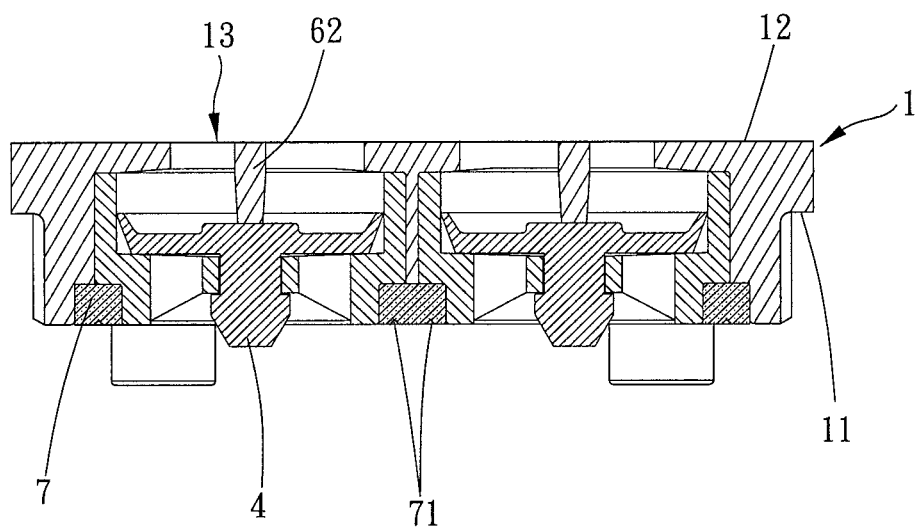
FIG. 4 is a cross-sectional view of FIG. 1.
Figure 8:
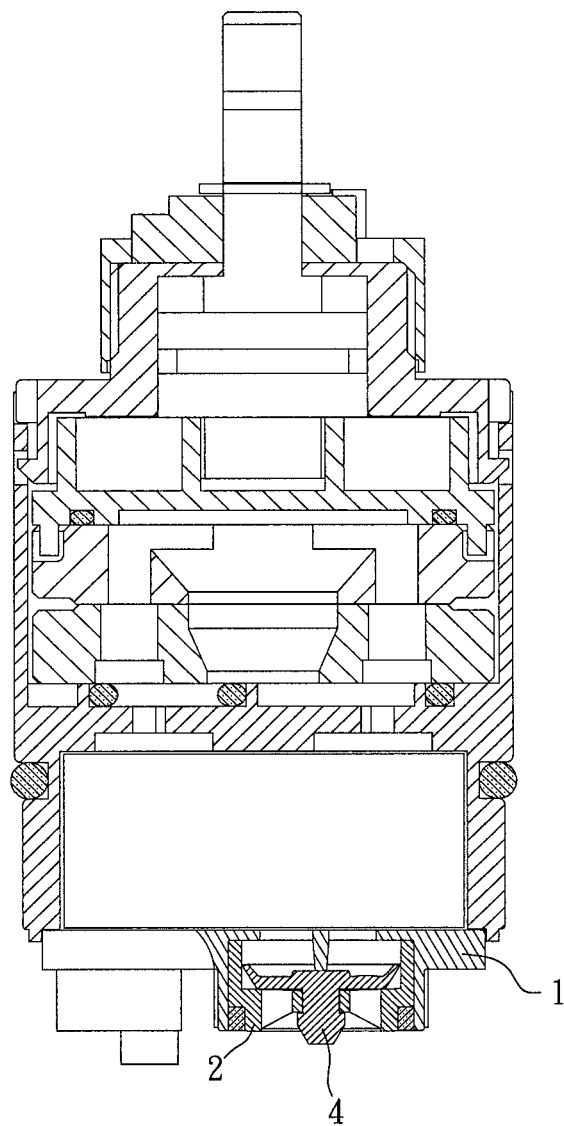
FIG. 8 is a cross-sectional view showing assembling of the present invention.
Figure 9:
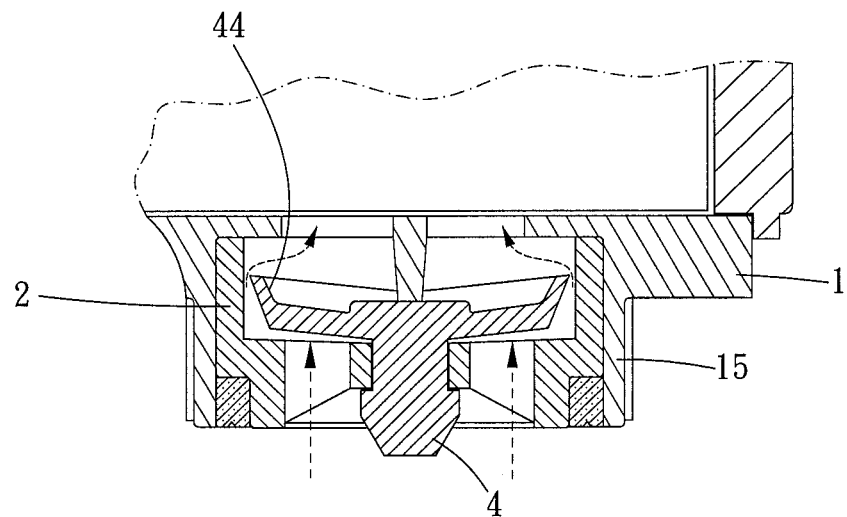
FIG. 9 is a drawing showing water flow entering the control valve base according to the present invention.
Figure 10:
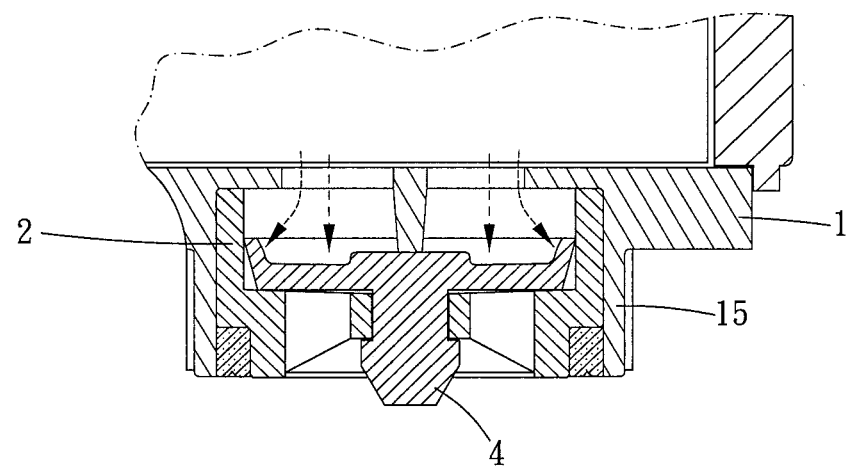
FIG. 10 is a drawing showing the check member blocking water flow according to the present invention.

Please refer to FIGS. 1 to 10 for an embodiment of the present invention. A check structure of a control valve base is provided, including a valve body 1, at least one seat body 2 and at least one check member 4.

The valve body 1 has a first face 11 and a second face 12, the valve body 2 has at least one inlet hole 13 and an outlet hole 14, the first face 11 has at least one annular flange 15 which extends away from the second face 12, each said annular flange 15 defines an interior space 16, and the interior space 16 and the inlet hole 13 communicate with each other. Preferably, each said annular flange 15 has a plurality of reinforcing ribs to strengthen the structure.

The at least one seat body 2 is respectively received in the interior space 16 of the at least one annular flange 15, each said seat body 2 includes a first passage 21 which has a large diameter, a second passage 22 which has a small diameter and a first engaging portion 3, the first passage 21 communicates with the second passage 22 and located between the inlet hole 13 and the second passage 22, and a step portion 23 is disposed between the first and second passages 21, 22. Specifically, each said interior space 16 is divided into a first receiving chamber 161 and a second receiving chamber 162, the first passage 21 is in the first receiving chamber 161, the second passage 22 is in the second receiving chamber 162, and the second receiving chamber 162 is greater than the first receiving chamber 161 in radial dimension. More specifically, the second receiving chamber 162 of the at least one annular flange 15 communicates with another second receiving chamber 162 of the at least one annular flange 15, and a water-proof member 7 is continuously engaged with the at least one second receiving chamber 162 and sleeved on the at least one second passage 22.

In this embodiment, a number of the at least one inlet hole 13, a number of the at least one annular flange 15 and a number of the at least one seat body 2 are respectively two, one of the two inlet holes 13 is for cold water to pass therethrough, the other of the two inlet holes 13 is for hot water to pass therethrough, and the outlet hole 14 is for warm water which is a mixture of the cold water and the hot water to pass therethrough. Specifically, the water-proof member 7 is 8-shaped, and a side of the water-proof member 7 which is opposite to the first face 11 further has a ditch 71.

The at least one check member 4 is respectively positioningly disposed in the at least one seat body 2, and each said check member 4 includes a blocking portion 41 which is flexible and a second engaging portion 5. The blocking portion 41 which is flexible can deform according to a force, the blocking portion 41 recovers to an original shape when the force is gone, and the second engaging portion 5 and the first engaging portion 3 are positioningly engaged with each other. In this embodiment, the blocking portion 41 is received in the first passage 21 and optionally blocks the first passage 21 to be discommunicated from the second passage 22. Specifically, the blocking portion 41 has a base portion 42 and a side portion 44, the side portion 44 is obliquely connected to the base portion 42 (in this embodiment, the side portion 44 is connected to an exterior periphery of the base portion 42); and more specifically, as viewed in a direction facing the first face 11, the base portion 42 covers the second passage 22.

Therefore, when a water flow flows from the first face 11 toward the second face 12 (flowing forward), the blocking portion 41 is impacted by the water flow and bends inward (in a substantially ")" shape) and thus has a gap between the blocking portion 41 and a wall of the first passage 21, the first and second passages 21, 22 communicate with each other, and the water flow can pass through the inlet hole 13 smoothly. When the water flow flows from the second face 12 toward the first face 11 (flowing backward), the blocking portion 41 is impacted by the water flow and deforms, the base portion 42 abuts against the step portion 23, and the side portion 44 abuts against the wall of the first passage 21 so as to block the first passage 21 from communicating with the second passage 22. The step portion 23 provides a normal support force evenly to the base portion 42 so that the base portion 42 can effectively resist a water pressure of the water flow which flows reversely. In addition, since the side portion 44 is obliquely arranged relative to the base portion 42, when the side portion 42 is impacted by the water flow which flows reversely, the side portion 42 contacts the wall of the first passage 21 tightly so as to effectively prevent the water flow which flows reversely from impacting the base portion 42 laterally and prevent the base portion 42 from being separated from the step portion 23.

The base portion 42 and the step portion 23 constitute a first flow-blocking structure, and the side portion 44 and the wall of the first passage 21 constitute a second flow-blocking structure to further form a multiple flow-blocking check structure. For example, there are small foreign matters in water (for example, sands), when the foreign matters abut against and between the step portion 32 and the base portion 42, there will be a gap therebetween, and the side portion 44 can effectively block the water flow which flows r to pass through. In other words, the side portion 44 can further increase a reliability of check function.

Specifically, the side portion 44 has a first end portion 45 and a second end portion 46, the first end portion 45 is connected to the base portion 42, the second end portion 46 optionally abuts against the wall of the first passage 21, and the side portion 44 decreases in thickness from the first end portion 45 toward the second end portion 46. The second end portion 46 which is thinner can quickly deform according to a force and contact the wall of the first passage 21 firmly to provide a preferable check effect. More specifically, the side portion 44 further has an outer side wall 47 and an inner side wall 48, a distance between the outer side wall 47 and the wall of the first passage 21 is smaller than a distance between the inner side wall 48 and the wall of the first passage 21, as viewed in a direction which is perpendicular to the first face 11 and the second face 12, a phantom extension of the outer side wall 47 and a phantom extension of the inner side wall 48 intersect with each other to form an included angle θ, and the included angle θ is between 5 degrees and 15 degrees to provide a preferable deformation effect.

To be more specific about the way that the check member 4 positioningly restricting the seat body 2, the first engaging portion 3 has a position-restricting hole 33, and the second engaging portion 5 is positioningly engaged in the position-restricting hole 33. More specifically, a thicknesswise direction between the first face 11 and the second face 12 is defined as a first direction, each said second engaging portion 5 includes a head portion 52 and a neck portion 51 which is connected to the base portion 42, the neck portion 51 is inserted in the position-restricting hole 33, and the head portion 52 is connected to the neck portion 51 and abuts against a wall which defines the position-restricting hole 33 on the first direction. In this embodiment, the first engaging portion 3 includes a plurality of ribs 31 and an annular rib 32, the annular rib 32 defines the position-restricting hole 33, and the ribs 31 are arranged in radiation equidistantly to form a plurality of hollow-out portions so that the water flow can pass through the hollow-out portions. In order to have better cooperation, the head portion 52 and the second passage 22 are preferably non-protrusive beyond the annular flange 15 on the first direction.

It is to be noted that preferably, an auxiliary section 53 extends from the head portion 52 along the first direction, during a process of the check member 4 being assembled to the seat body 2, the auxiliary section 53 is disposed through the position-restricting hole 33 for a force being applied thereon from outside to drive the head portion 52 and the neck portion 51 to be engaged with the first engaging portion 3, and after the check member 4 is assembled to the seat body 2, the auxiliary section 53 is disassembled from the head portion 52. The head portion 52 is disposed through the position-restricting hole 33 first and then engaged with a wall of the position-restricting portion 33; therefore, preferably, the head portion 52 is gradually tapered toward a direction away from the base portion 42 in a substantially degrees so that the head portion 52 can be disposed through the position-restricting hole 33 smoothly. Similarly, a whole of each said check member 4 is preferably flexible. In this embodiment, each said check member 4 is made of rubber, and a hardness of the check member 4 is between 40 and 80 Shore.

In addition, to improve the stability when the blocking portion 41 deforms, the check structure of the control valve base of further includes an abutting mechanism 6, the abutting mechanism 6 has a lateral rib 61 and an abutting member 62, the lateral rib 61 is laterally positioned in the inlet hole 13, the abutting member 62 is disposed on the lateral rib 61 and extending toward a direction away from the second face 12 into the interior space 16, and the abutting member 62 abuts against a side of the blocking portion 41 opposite to the second engaging portion 5. In this embodiment, each said blocking portion 41 further has an abutted portion 43 which abuts against the abutting member 61, and the abutted portion 43 and the second engaging portion 5 are respectively and coaxially arranged on two opposite sides of the base portion 42.

Given the above, in the check structure of the control valve base, the blocking portion which is flexible is deformable according to directions of the water flow so as to block the water flow completely. The step portion provides a normal support force evenly to the base portion so that the base portion can effectively resist the water pressure of the water flow which flows reversely. In addition, the side portion is oblique to the base portion so that the water flow which flows reversely can be prevented from impacting the base portion laterally so as to elevate the check effect.

While we have shown and described various embodiments in accordance with the present invention, it should be clear to those skilled in the art that further embodiments may be made without departing from the scope of the present invention.

What is claimed is:

1. A check structure of a control valve base, including:
   a valve body, having a first face and a second face, the valve body having at least one inlet hole and an outlet hole, the first face having at least one annular flange which extends away from the second face, each said annular flange defining an interior space, the interior space and the inlet hole communicating with each other;
   at least one seat body, respectively received in the interior space of the at least one annular flange, each said seat body including a first passage which has a large diameter, a second passage which has a small diameter and a first engaging portion, the first passage communicating with the second passage and located between the inlet hole and the second passage, a step portion being disposed between the first and second passages;
   at least one check member, respectively positioningly disposed in the at least one seat body, each of the at least one check member including a blocking portion which is flexible and a second engaging portion, the second engaging portion and the first engaging portion being positioningly engaged with each other, the blocking portion being received in the first passage and optionally blocking the first passage to be discommunicated from the second passage, the blocking portion having a base portion and a side portion, the side portion being obliquely connected to the base portion, as viewed in a direction facing the first face, the base portion covering the second passage;
   an abutting mechanism, the abutting mechanism having a lateral rib and an abutting member, the lateral rib laterally positioned in the inlet hole, the abutting member being disposed on the lateral rib and extending into the interior space, the abutting member abutting against a side of the blocking portion opposite to the second engaging portion;
   wherein when a water flow flows from the first face toward the second face, the blocking portion is impacted by the water flow and further has a gap between the blocking portion and a wall of the first passage, and the first and second passages communicate with each other; when the water flow flows from the second face toward the first face, the blocking portion is impacted by the water flow and deforms, the base portion abuts against the step portion, and the side portion abuts against the wall of the first passage so as to block the first passage to be discommunicated from the second passage;
   wherein the first engaging portion has a position-restricting hole, and the second engaging portion is positioningly engaged in the position-restricting hole;
   wherein a thicknesswise direction between the first face and the second face is defined as a first direction, each said second engaging portion includes a head portion and a neck portion which is connected to the base portion, the neck portion is inserted in the position-restricting hole, and the head portion is connected to the neck portion and abuts against a wall which defines the position-restricting hole on the first direction;
   wherein an auxiliary section extends from the head portion along the first direction, during a process of the check member being assembled to the seat body, the auxiliary section is disposed through the position-restricting hole for a force being applied thereon from outside to drive the head portion and the neck portion to be engaged with the first engaging portion, and after the check member is assembled to the seat body, the auxiliary section is disassembled from the head portion.

2. The check structure of the control valve base of claim 1, wherein the side portion has a first end portion and a second end portion, the first end portion is connected to the base portion, the second end portion abuts against the wall of the first passage, and the side portion decreases in thickness from the first end portion toward the second end portion.

3. The check structure of the control valve base of claim 2, wherein the side portion further has an outer side wall and an inner side wall, a distance between the outer side wall and the wall of the first passage is smaller than a distance between the inner side wall and the wall of the first passage, as viewed in a direction which is perpendicular to the first face and the second face, a phantom extension of the outer side wall and a phantom extension of the inner side wall intersect with each other to form an included angle, and the included angle is between 5 degrees and 15 degrees.

4. The check structure of the control valve base of claim 1, wherein each said blocking portion further has an abutted portion which abuts against the abutting member, and the abutted portion and the second engaging portion are respectively and coaxially arranged on two opposite sides of the base portion.

5. The check structure of the control valve base of claim 1, wherein each said interior space is divided into a first receiving chamber and a second receiving chamber, the first passage is in the first receiving chamber, the second passage is in the second receiving chamber, and the second receiving chamber is greater than the first receiving chamber in radial dimension; the second receiving chamber of the at least one annular flange communicates with another second receiving chamber of the at least one annular flange, and a water-proof member is continuously engaged with the second receiving chamber and sleeved on the at least one second passage.

6. The check structure of the control valve base of claim 1, wherein a number of the at least one inlet hole, a number of the at least one annular flange and a number of the at least one seat body are respectively two; an entirety of each said check member is flexible; each said check member is made of rubber, and a hardness of the check member is between 40 and 80 Shore; the head portion is tapered in a substantially 60 degrees; the first engaging portion includes a plurality of ribs and an annular rib, the annular rib defines the position-restricting hole, and the ribs are arranged in radiation equidistantly to form a plurality of hollowed out portions; each said annular flange has a plurality of reinforcing ribs; the head portion and the second passage are non-protrusive beyond the annular flange on the first direction; the side portion has a first end portion and a second end portion, the first end portion is connected to the base portion, the second end portion abuts against the wall of the first passage, and the side portion decreases in thickness from the first end portion toward the second end portion; the side portion further has an outer side wall and an inner side wall, a distance between the outer side wall and the wall of the first passage is smaller than a distance between the inner side wall and the wall of the first passage, as viewed in a direction which is perpendicular to the first face and the second face, a phantom extension of the outer side wall and a phantom extension of the inner side wall intersect with each other to form an included angle, and the included angle is between 5 degrees and 15 degrees; each said blocking portion further has an abutted portion which abuts against the abutting member, and the abutted portion and the second engaging portion are respectively and coaxially arranged on two opposite sides of the base portion; each said interior space is divided into a first receiving chamber and a second receiving chamber, the first passage is in the first receiving chamber, the second passage is in the second receiving chamber, and the second receiving chamber is greater than the first receiving chamber in radial dimension; the second receiving chamber of the at least one annular flange communicates with another second receiving chamber of the at least one annular flange, and a water-proof member is continuously engaged with the at least one second receiving chamber and sleeved on the at least one second passage; a side of the water-proof member which is opposite to the first face further has a ditch; and the water-proof member is 8-shaped.

* * * * *